(12) United States Patent
Ohtomo

(10) Patent No.: US 7,950,943 B2
(45) Date of Patent: May 31, 2011

(54) ELECTRIC VEHICLE CONTROL DEVICE

(75) Inventor: Yosuke Ohtomo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 36 days.

(21) Appl. No.: 12/432,124

(22) Filed: Apr. 29, 2009

(65) Prior Publication Data
US 2009/0286414 A1 Nov. 19, 2009

(30) Foreign Application Priority Data

May 19, 2008 (JP) ................................. 2008-130891
Mar. 25, 2009 (JP) ................................. 2009-073217

(51) Int. Cl.
*H01R 13/62* (2006.01)
(52) U.S. Cl. ...................................................... 439/299
(58) Field of Classification Search .................... 439/34, 439/299, 310, 372; 320/108, 109; 307/70.1
See application file for complete search history.

(56) References Cited

U.S. PATENT DOCUMENTS

| | | | | |
|---|---|---|---|---|
| 4,980,800 A | * | 12/1990 | Furuta | 361/727 |
| 5,433,623 A | * | 7/1995 | Wakata et al. | 439/310 |
| 5,598,084 A | * | 1/1997 | Keith | 320/109 |
| 6,157,162 A | * | 12/2000 | Hayashi et al. | 320/104 |
| 7,023,177 B1 | * | 4/2006 | Bussinger | 320/109 |

FOREIGN PATENT DOCUMENTS

JP 06-284512 10/1994

\* cited by examiner

*Primary Examiner* — Alexander Gilman
(74) *Attorney, Agent, or Firm* — McDermott Will & Emery LLP

(57) ABSTRACT

To secure safety in an electric vehicle during charging, the electric vehicle is provided with a high voltage battery and a charging port portion for charging the high voltage battery. A power reception connector and a connector locking mechanism are provided in the charging port portion, and a fitting hole is formed in a power supply connector disposed on an external power supply side. The connector locking mechanism is switched between a restrained condition, in which a locking pin is inserted into the fitting hole, and a released condition, in which the locking pin is retracted from the fitting hole. A vehicle control unit for controlling the connector locking mechanism switches the connector locking mechanism to the restrained condition when a door is locked, and switches the connector locking mechanism to the released condition when the door is unlocked. Thus, the connection condition between the power reception connector and the power supply connector can be maintained even when a passenger locks the door and moves away from the electric vehicle, and as a result, safety can be secured during charging.

6 Claims, 9 Drawing Sheets

10 : Electric automobile
15 : High voltage battery (storage device)
24 : Vehicle control unit (door lock determining means, connector lock control means)
31 : Door
38 : Charging port portion
39 : Power reception connector
47 : Power supply connector
70 : Connector locking mechanism
71 : Fitting hole
72 : Locking pin Fig. 2
(A)
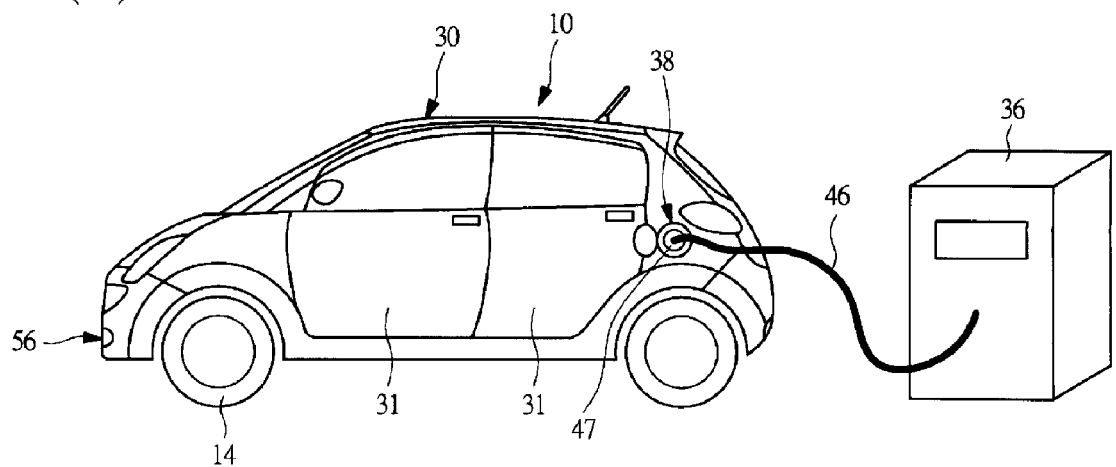
(B)
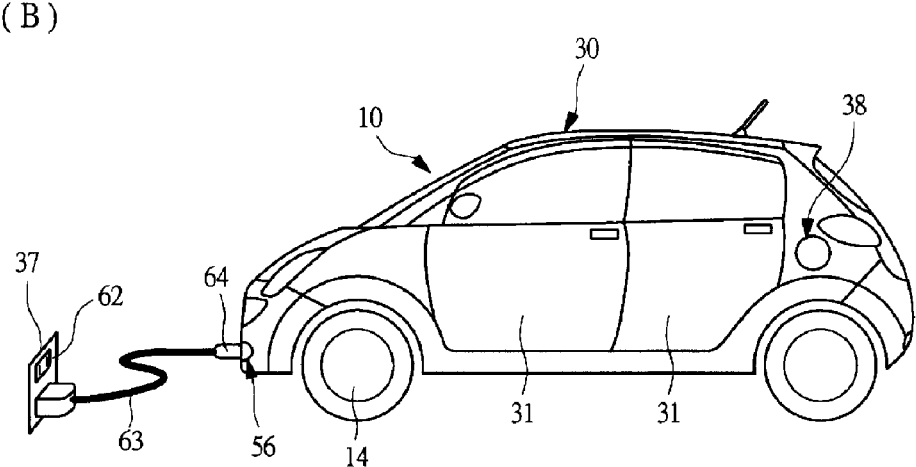

ELECTRIC VEHICLE CONTROL DEVICE

CROSS-REFERENCE TO RELATED APPLICATIONS

The disclosure of Japanese Patent Application No. 2008-130891 filed on May 19, 2008 and Japanese Patent Application No. 2009-073217 filed on Mar. 25, 2009 including the specification, drawings, and abstract are incorporated herein by reference in its entirely.

BACKGROUND OF THE INVENTION

1. Field of the Invention

The present invention relates to a control apparatus for an electric vehicle having a storage device that is charged by an external power supply.

2. Description of the Related Art

Electric vehicles that have an electric motor alone as a drive source and hybrid type electric vehicles that have an engine and an electric motor as drive sources exist. These electric vehicles are installed with a storage device such as a lithium ion battery. Further, an electric vehicle is provided with a charging port, and when the storage device is charged, a charging cable extending from an external power supply is connected to the charging port (see Japanese Unexamined Patent Application No. H6-284512, for example). The storage device may also be charged using a method in which a charging cable of a fast charger disposed in a power supply station or the like is connected to the charging port or a method in which a charging cable extending from a household power supply is connected to the charging port.

However, when a charging cable is simply connected to the charging port, as described in Japanese Unexamined Patent Application No. H6-284512, the charging cable may become disconnected, which is undesirable in terms of safety and crime prevention. An operation to charge the storage device requires more time than a conventional fuel supply operation, and therefore a situation in which an operator moves away from the electric vehicle may be envisaged. Hence, demand exists for a structure with which safety can be secured during charging even when the operator moves away from the electric vehicle.

SUMMARY OF THE INVENTION

An object of the present invention is to secure safety in an electric vehicle during charging, even when an operator moves away from the electric vehicle.

A control apparatus for an electric vehicle according to the present invention is a control apparatus for an electric vehicle including a storage device that is charged by an external power supply, in which a power supply connector on the external power supply side is connected to a power reception connector on a vehicle body side when the storage device is charged. The control apparatus includes: door lock determining means for determining a lock condition of a door provided in the vehicle body; a connector locking mechanism that is provided on the vehicle body side and is switched between a restrained condition, in which the power supply connector and the power reception connector a reset in a locked condition, and a released condition, in which the power supply connector and the power reception connector are set in an unlocked condition; and connector lock control means for switching the connector locking mechanism to the restrained condition when the door is in a locked condition.

In the control apparatus for an electric vehicle according to the present invention, the connector lock control means switches the connector locking mechanism to the released condition when the door is in an unlocked condition.

In the control apparatus for an electric vehicle according to the present invention, the connector locking mechanism includes a solenoid coil, and the connector locking mechanism is switched to the restrained condition when the solenoid coil is de-energized and switched to the released condition when the solenoid coil is energized.

In the control apparatus for an electric vehicle according to the present invention, the power reception connector and the connector locking mechanism are provided in a charging port portion disposed in the vehicle body.

In the control apparatus for an electric vehicle according to the present invention, the power reception connector and the connector locking mechanism are provided on a tip end portion of a charging cable extending from the vehicle body.

According to the present invention, the connector locking mechanism is switched to the restrained condition when the door is locked such that the power supply connector on the external power supply side and the power reception connector on the vehicle body side are set in a locked condition, and therefore, the power reception connector and the power supply connector do not become disconnected even when an operator moves away from the electric vehicle during charging. As a result, an improvement in the safety of the electric vehicle during charging can be obtained.

BRIEF DESCRIPTION OF THE DRAWINGS

FIGS. 2A and 2B are illustrative views showing the electric vehicle when charged by an external power supply;

DESCRIPTION OF THE PREFERRED EMBODIMENTS

Figure 1:
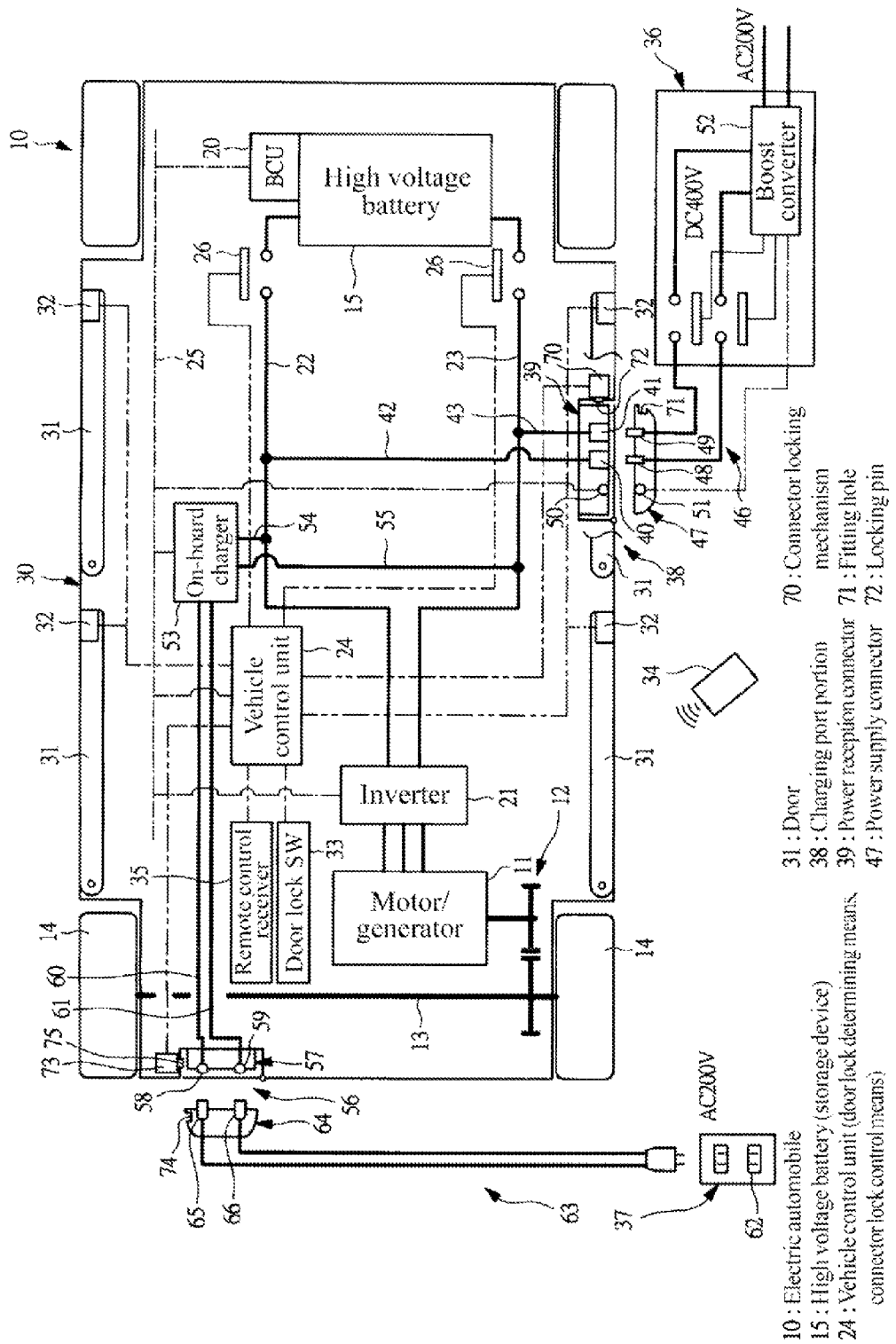
FIG. 1 is a schematic view showing the constitution of an electric vehicle.

Embodiments of the present invention will be described in detail below on the basis of the drawings. FIG. 1 is a schematic view showing the constitution of an electric vehicle 10 provided with a control apparatus for an electric vehicle according to an embodiment of the present invention. As shown in FIG. 1, a motor/generator 11 is installed in a vehicle body front portion as a drive source. A front wheel drive shaft 13 is connected to the motor/generator 11 via a gear train 12, and front wheels 14 serving as drive wheels are connected to the front wheel drive shaft 13. Further, a high voltage battery 15 (for example, a 400V lithium ion battery) is installed in the electric vehicle 10 as a storage device for storing power to be supplied to the motor/generator 11. When a brake is applied to the electric vehicle 10, the motor/generator 11 is driven to generate power, and this power is collected in the high voltage battery 15.

A battery control unit (BCU) 20 is connected to the high voltage battery 15 to control charging/discharging of the high voltage battery 15. The battery control-unit 20 not only controls a voltage and a current of the high voltage battery 15, but also calculates an SOC (state of charge) of the high voltage battery 15 on the basis of the voltage, current, temperature, and so on. Further, an inverter 21 is connected to the motor/generator 11 to control a torque and a rotation speed of the motor/generator 11. The inverter 21 is connected to the high voltage battery 15 via electric cables 22, 23, and the inverter 21 converts a direct current from the high voltage battery 15 into an alternating current and supplies the alternating current to the motor/generator 11. By having the inverter 21 control a current value and a frequency of the alternating current, the torque and rotation speed of the motor/generator 11 can be controlled. The electric vehicle 10 is further provided with a vehicle control unit 24 that performs overall control of the entire vehicle, and the vehicle control unit 24 outputs control signals to the battery control unit 20, the inverter 21, and so on. Further, the vehicle control unit 24, the battery control unit 20, the inverter 21, and so on are connected to a communication network 25 such that the vehicle control unit 24, the battery control unit 20, the inverter 21, and so on can share control information. Note that a main relay 26 is provided in the electric cables 22, 23, and the main relay 26 is controlled by the vehicle control unit 24.

Further, a plurality of doors 31 are provided in a vehicle body 30 of the electric vehicle 10 to be free to open and close, and a door locking mechanism 32 constituted by a striker or the like is provided in each door 31. The door locking mechanism 32 is connected to the vehicle control unit 24 and is switched between a locked condition and an unlocked condition on the basis of a control signal from the vehicle control unit 24. Further, a door lock switch 33 that is operated manually by a passenger and a remote control receiver 35 for receiving a transmission signal from a remote control key 34 are connected to the vehicle control-unit 24. When the passenger performs a locking operation using the door lock switch 33 or the remote control key 34, a lock signal is output from the vehicle control unit 24 to the door locking mechanism 32, causing the door locking mechanism 32 to enter the locked condition such that the door 31 is locked. When the passenger performs an unlocking operation using the door lock switch 33 or the remote control key 34, on the other hand, an unlock signal is output from the vehicle control unit 24 to the door locking mechanism 32, causing the door locking mechanism 32 to enter the unlocked condition such that the door 31 is unlocked. Note that a lock condition of the door 31 is set using the remote control key 34, which serves as a non-contact type key, but the lock condition of the door 31 may be set by inserting a mechanical key into a keyhole.

FIGS. 2A and 2B are illustrative views showing the electric vehicle 10 when charged by an external power supply. FIG. 2A shows a fast charging mode using a fast charger (external power supply) 36, and FIG. 2B shows a home charging mode using a household power supply (external power supply) 37. As shown in FIG. 1 and FIG. 2A, a charging port portion 38 is provided in a vehicle body side portion so that the fast charging mode can be executed using the fast charger 36, which is disposed in a power supply station or the like, and a fast charging power reception connector 39 is disposed in the charging port portion 38. The power reception connector 39 includes a pair of connection terminals 40, 41, one connection terminal 40 being connected to the electric cable 22 via a electric cable 42 and the other connection terminal 41 being connected to the electric cable 23 via a electric cable 43. In other words, the connection terminals 40, 41 of the power reception connector 39 are connected to a positive electrode and a negative electrode of the high voltage battery 15.

Further, a power supply connector 47 is provided in a charging cable 46 extending from the fast charger 36, and a pair of connection terminals 48, 49 corresponding to the connection terminals 40, 41 of the power reception connector 39 are provided in the power supply connector 47. When the high voltage battery 15 is subjected to fast charging, the power supply connector 47 is connected to the power reception connector 39, whereupon a charging current is supplied to the high voltage battery 15 from the fast charger 36. Furthermore, the fast charger 36 is connected to the communication network 25 via the power reception connector 39 and control terminals 50, 51 of the power supply connector 47, and therefore the fast charger 36 executes charging control in accordance with a control signal from the vehicle control unit 24. Note that a boost converter 52 for converting a low voltage (200V, for example) alternating current into a high voltage (400V, for example) direct current is incorporated into the fast charger 36.

As shown in FIG. 1 and FIG. 2B, an on-board charger 53 for converting an alternating current from the household power supply 37 into a direct current having a high voltage (400V, for example) that corresponds to the high voltage battery 15 is installed in the electric vehicle 10 so that the home charging mode can be executed using the household power supply 37 (AC 200 V, for example). The on-board charger 53 includes a pair of electric cables 54, 55, one electric cable 54 being connected to the electric cable 22 and the other electric cable 55 being connected to the electric cable 23. Furthermore, a home charging power reception connector 57 is disposed in a charging port portion 56 provided in the vehicle body front portion to connect the household power supply 37 to the on-board charger 53. The power reception connector 57 includes a pair of connection terminals 58, 59, one connection terminal 58 being connected to the on-board charger 53 via a electric cable 60 and the other connection terminal 59 being connected to the on-board charger 53 via a electric cable 61. In other words, the connection terminals 58, 59 of the power reception connector 57 are connected to the positive electrode and the negative electrode of the high voltage battery 15 via the on-board charger 53.

Further, a power supply connector 64 is provided in a charging cable 63 connected to a socket 62 of the household power supply 37, and a pair of connection terminals 65, 66 corresponding to the connection terminals 58, 59 of the power reception connector 57 are provided in the power supply connector 64. When the high voltage battery 15 is charged by the household power supply 37, the power supply connector 64 is connected to the power reception connector 57. As a result, the alternating current from the household power supply 37 is supplied to the on-board charger 53, converted into a charging current by the on-board charger 53, and then supplied to the high voltage battery 15. Note that the on-board charger 53 is connected to the communication network 25 such that the on-board charger 53 executes charging control in accordance with a control signal from the vehicle control unit 24.

When the high voltage battery 15 is charged using an external power supply in this manner, the power supply connector 47, 64 on the external power supply side is connected to the power reception connector 39, 57 on the vehicle body 30 side. However, to secure safety during charging, the connection condition between the power reception connector 39, 57 and the power supply connector 47, 64 must be maintained reliably. Therefore, the control apparatus for an electric vehicle according the present invention switches the power reception connector 39, 57 and the power supply connector 47, 64 to a locked condition under a predetermined condition in order to ensure that the power supply connector 47, 64 does not become disconnected from the power reception connector 39, 57. A structure for switching the power reception connector 39, 57 and the power supply connector 47, 64 to the locked condition and a control procedure executed when switching the power reception connector 39, 57 and the power supply connector 47, 64 to the locked condition will be described below.

First, as shown in FIG. 1, a connector locking mechanism 70 is provided in the fast charging port portion 38 together with the power reception connector 39, and a concaved fitting hole 71 is formed in the power supply connector 47 that is connected to the charging port portion 38. By inserting a locking pin 72 of the connector locking mechanism 70 into the fitting hole 71 of the power supply connector 47 after connecting the power supply connector 47 to the power reception connector 39, the power reception connector 39 and the power supply connector 47 are switched to the locked condition. Similarly, a connector locking mechanism 73 is provided in the home charging port portion 56 together with the power reception connector 57, and a concaved fitting hole 74 is formed in the power supply connector 64 that is connected to the charging port portion 56. By inserting a locking pin 75 of the connector locking mechanism 73 into the fitting hole 74 of the power supply connector 64 after connecting the power supply connector 64 to the power reception connector 57, the power reception connector 57 and the power supply connector 64 are switched to the locked condition.

Figure 3:
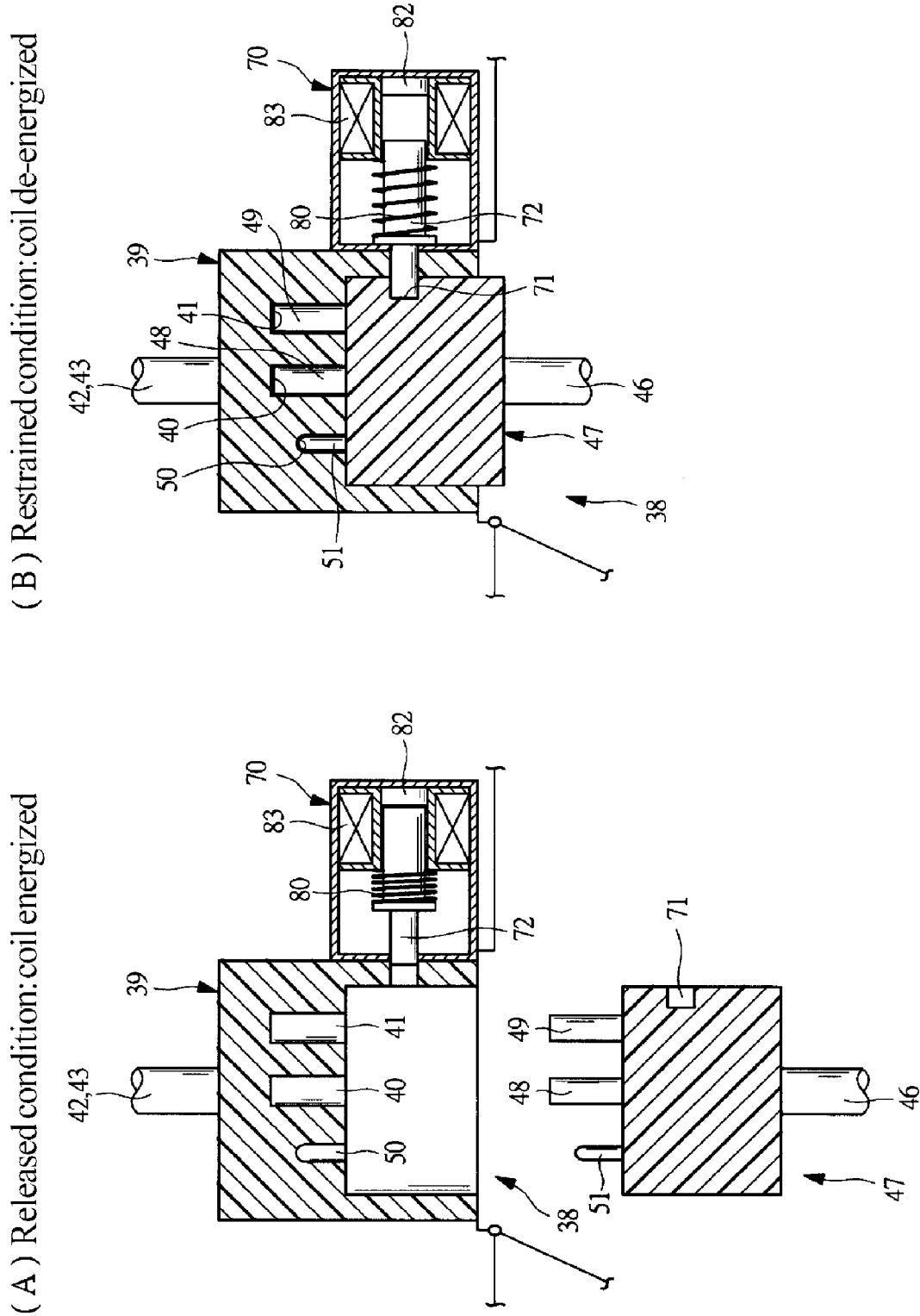
FIGS. 3A and 3B are schematic sectional views showing the structure of a charging port portion.

FIGS. 3A and 3B are schematic sectional views showing the structure of the charging port portion 38. The fast charging port portion 38 is illustrated in the drawings, but the home charging port portion 56 has an identical structure. As shown in FIGS. 3A and 3B, the connector locking mechanism 70 is provided adjacent to the power reception connector 39. The connector locking mechanism 70 includes the locking pin 72, which is free to move between a projecting position and a retracted position, a spring member 80 for biasing the locking pin 72 toward the projecting position, and a solenoid portion 81 for aspirating the locking pin 72 toward the retracted position. Further, the solenoid portion 81 of the connector locking mechanism 70 is constituted by an iron core 82 and a solenoid coil 83 wound around the iron core 82. When the solenoid coil 83 is energized, the iron core 82 opposing the locking pin 72 is magnetized, and as a result, the locking pin 72 is aspirated toward the iron core 82 while compressing the spring member 80. When the solenoid coil 83 is de-energized, on the other hand, magnetization of the iron core 82 opposing the locking pin 72 is terminated, and therefore the locking pin 72 is pushed outward by the spring force of the spring member 80.

More specifically, as shown in FIG. 3A, when the solenoid coil 83 is switched to an energized condition, the connector locking mechanism 70 is switched to a released condition in which the locking pin 72 is moved to the retracted position. By switching the connector locking mechanism 70 to the released condition in this manner, the power reception connector 39 and the power supply connector 47 are set in the unlocked condition such that the power supply connector 47 can be attached to and detached from the power reception connector 39 freely. When, on the other hand, the solenoid coil 83 is set in a de-energized condition, as shown in FIG. 3B, the connector locking mechanism 70 is switched to a restrained condition in which the locking pin 72 is moved to the projecting position. By switching the connector locking mechanism 70 to the restrained condition in this manner, the power reception connector 39 and the powers supply connector 47 are set in the locked condition such that the power supply connector 47 cannot be detached from the power reception connector 39. Note that the vehicle control unit 24 is connected to the solenoid coil 83 of the connector locking mechanism 70, and the connector locking mechanism 70 is switched between the restrained condition and the released condition by the vehicle control unit 24.

Next, connector lock control for switching the connector locking mechanism 70, 73 between the restrained condition and the released condition will be described. Note that the connector lock control is executed by the vehicle control unit 24 functioning as connector lock control means. Here, FIG. 4 is a flowchart showing an example of a procedure executed during the connector lock control.

Figure 4:
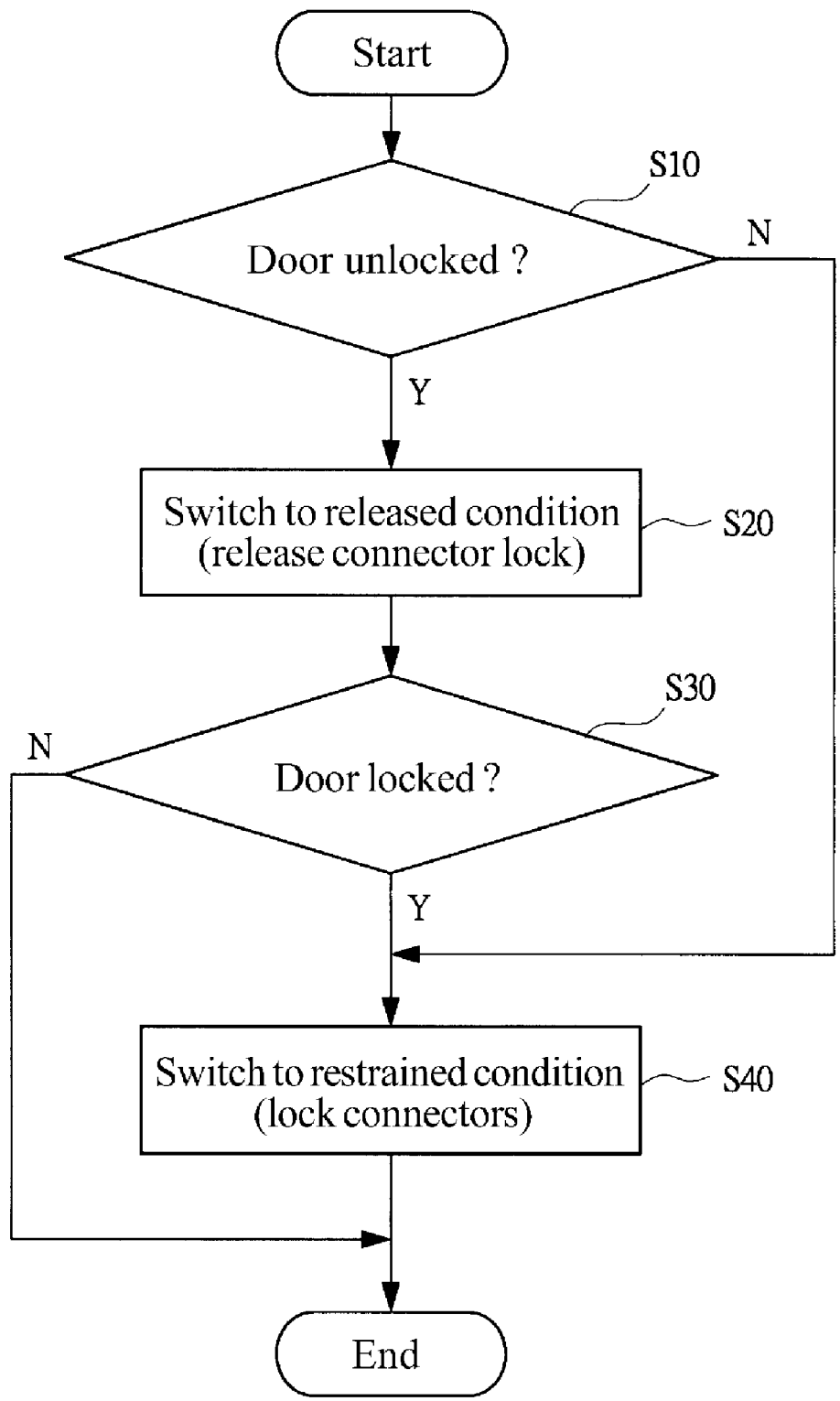
FIG. 4 is a flowchart showing an example of a procedure executed during connector lock control.

As shown in FIG. 4, in a step S10, the vehicle control unit 24 functioning as door lock determining means determines whether or not the door 31 is in the unlocked condition on the basis of an operating condition of the door locking mechanism 32. When it is determined in the step S10 that the door 31 is in the unlocked condition, the routine advances to a step S20, in which the vehicle control unit 24 switches the connector locking mechanism 70, 73 to the released condition. Next, in a step S30, a determination is made as to whether or not the door 31 is in the locked condition. When it is determined in the step S30 that the door 31 is in the locked condition, the routine advances to a step S40, in which the connector locking mechanism 70, 73 is switched to the restrained condition. When it is determined in the step S1 that the door 31 is in the locked condition, the routine advances to the step S40, in which the connector locking mechanism 70, 73 is switched to the restrained condition.

When the door 31 is locked, a situation in which the passenger (operator) moves away from the electric vehicle 10 may be envisaged, and therefore the connector locking mechanism 70, 73 is switched to the restrained condition such that the power reception connector 39 and the power supply connector 47, or the power reception connector 57 and the power supply connector 64, are switched to the locked condition. Thus, situations in which the power supply connector 47, 64 falls out of the charging port portion 38, 56 or the power supply connector 47, 64 is detached by a third party are prevented from occurring during charging, and as a result, safety in the electric vehicle 10 can be secured during charging. Furthermore, when the door 31 is unlocked, a situation in which the passenger is close to the electric vehicle 10 may be envisaged, and therefore the connector locking mechanism 70, 73 is switched to the released condition such that the power reception connector 39 and the power supply connector 47, or the power reception connector 57 and the power supply connector 64, are switched to the unlocked condition. Thus, the power supply connector 47, 64 can be attached to or detached from the charging port portion 38, 56 without forcing the passenger to perform a troublesome operation at the start of the charging or when the charging is complete.

Figure 5:
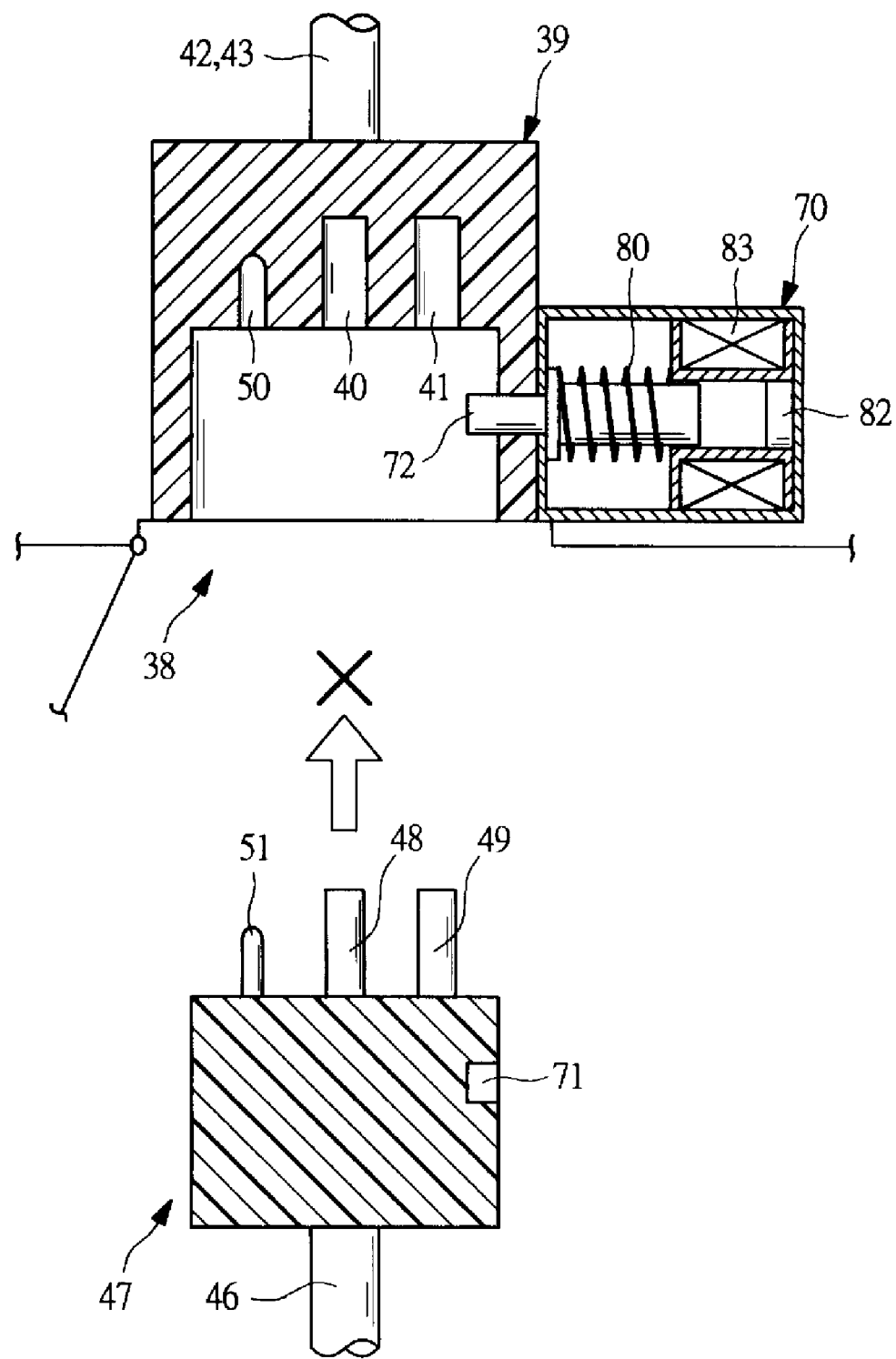
FIG. 5 is a sectional view showing the condition of the charging port portion when the vehicle is parked.

Furthermore, the connector locking mechanism 70, 73 is switched to the released condition when the solenoid coil 83 is energized and switched to the restrained condition when the solenoid coil 83 is de-energized. By switching the connector locking mechanism 70, 73 to the restrained condition when the solenoid coil 83 is de-energized in this manner, the need to energize the solenoid coil 83 continuously during charging is eliminated, and therefore unnecessary power consumption can be avoided and the durability of the connector locking mechanism 70, 73 can be improved. Moreover, since the connector locking mechanism 70, 73 is switched to the restrained condition when the solenoid coil 83 is de-energized, vandalism by a third party when the vehicle is parked can be prevented. FIG. 5 is a sectional view showing the condition of the charging port portion 38 when the vehicle is parked. As shown in FIG. 5, when the power supply of a control system is cut off in a parked vehicle, for example, the connector locking mechanism 70 is switched to the restrained condition as the solenoid coil 83 is de-energized, and therefore vandalism performed by a third party, such as inserting the power supply connector 47 into the power reception connector 39, can be prevented. Note that FIG. 5 shows the fast charging port portion 38, but likewise with respect to the home charging port portion 56, the connector locking mechanism 73 is switched to the restrained condition when the power supply of the control system is cut off, and therefore vandalism such as insertion of the power supply connector 64 can be prevented in a similar manner.

Figure 6:
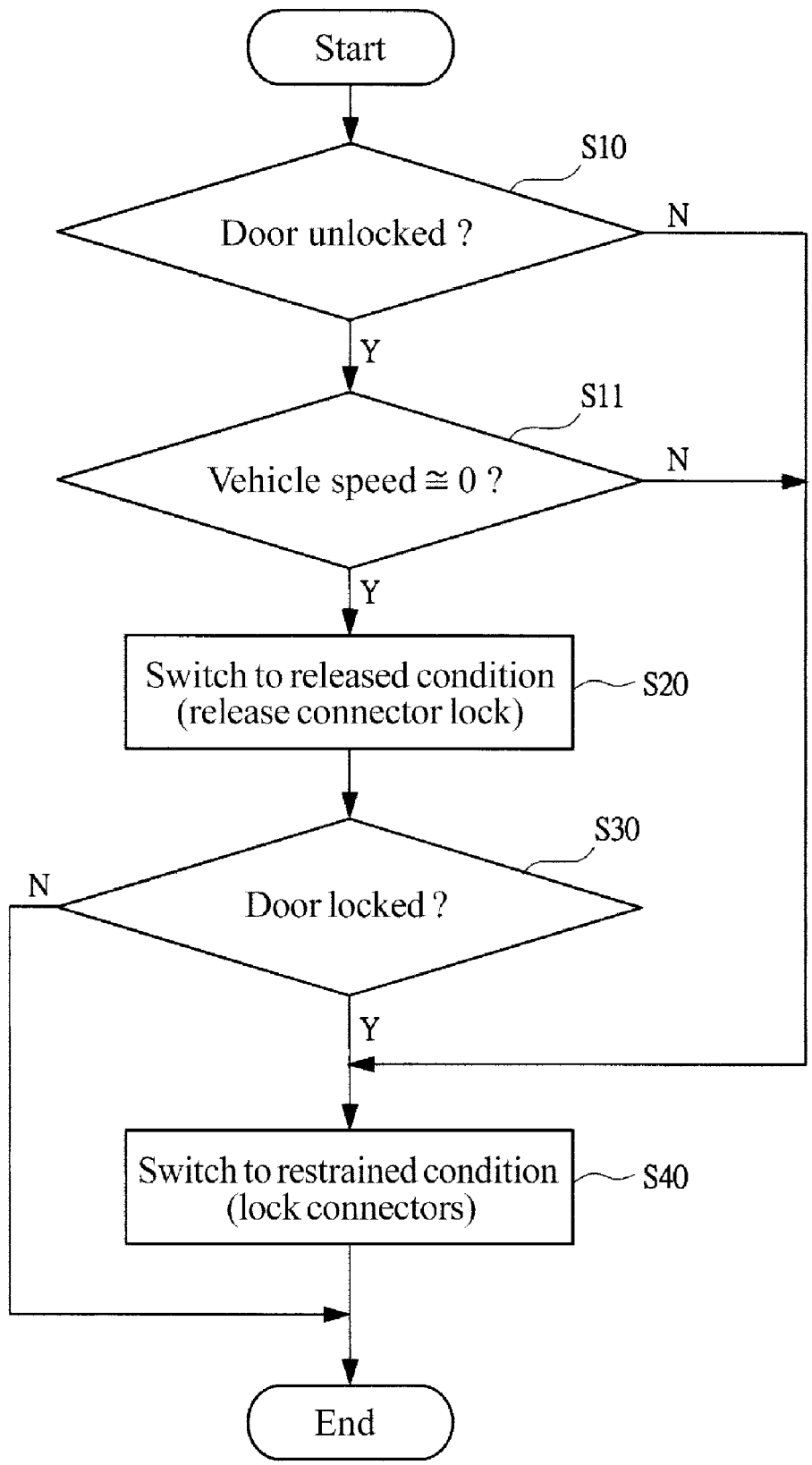
FIG. 6 is a flowchart showing another example of the procedure executed during connector lock control.

Furthermore, in the flowchart described above, the operating condition of the connector locking mechanism 70, 73 is controlled on the basis of locking or unlocking of the door 31, but the present invention is not limited thereto, and the operating condition of the connector locking mechanism 70, 73 may be controlled on the basis of an additional condition relating to vehicle speed or the like. FIG. 6 is a flowchart showing another example of the procedure executed during the connector lock control. Note that in the flowchart shown in FIG. 6, identical steps to the steps shown in FIG. 4 have been allocated identical reference symbols, and description thereof has been omitted.

As shown in FIG. 6, when the door 31 is determined to be in the unlocked condition in the step S10, the routine advances to a step S11, in which the vehicle control unit 24 determines whether or not the vehicle is in a halted condition (vehicle speed≅0) on the basis of a detection signal from a vehicle speed sensor or the like, not shown in the drawings. When it is determined in the step S11 that the vehicle is in the halted condition, the routine advances to the step S20, in which the connector locking mechanism 70, 73 is switched to the released condition. When it is determined in the step S11 that the vehicle is in a traveling condition, on the other hand, the routine advances to the step S40, in which the connector locking mechanism 70, 73 is switched to the restrained condition.

Hence, when the door 31 is locked and the vehicle is stationary, the solenoid coil 83 of the connector locking mechanism 70, 73 is energized such that the connector locking mechanism 70, 73 is switched to the released condition. Thus, the connector locking mechanism 70, 73 is not switched to the released condition when the door 31 is unlocked during vehicle travel, and therefore the solenoid coil 83 is never energized during vehicle travel. As a result, unnecessary power consumption can be avoided, and the durability of the connector locking mechanism 70, 73 can be improved.

Figure 7:
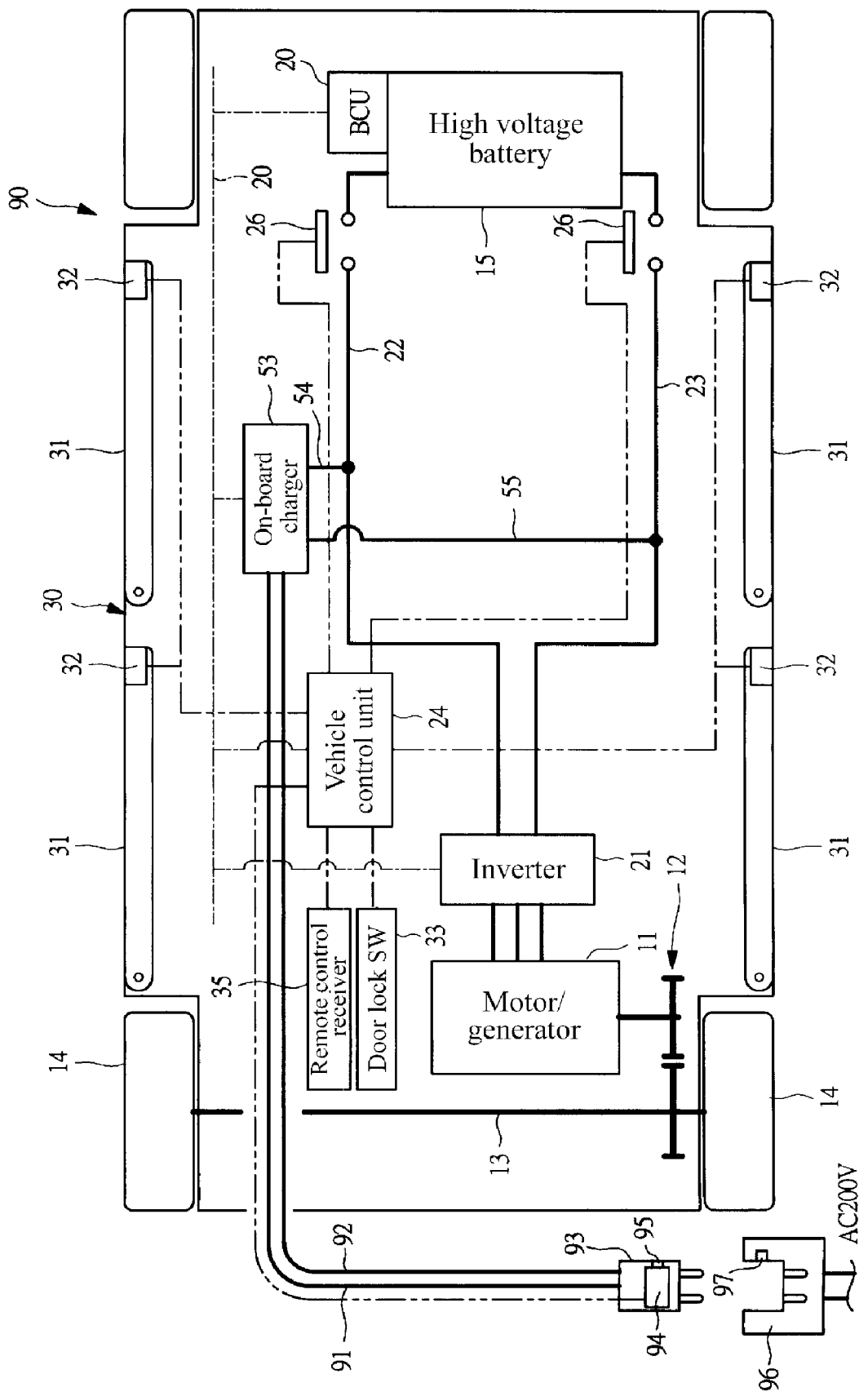
FIG. 7 is a schematic view showing the constitution of an electric vehicle to which a control apparatus for an electric vehicle according to another embodiment of the present invention is applied.

Furthermore, in the above description, as shown in FIG. 1, the power reception connector 39, 57 is disposed in the charging port portion 38, 56 provided in the vehicle body 30 such that the power supply connector 47, 64 of the charging cable 46, 63 extending from the fast charger 36 or another external power supply is connected to the power reception connector 39, 57. However, the present invention is not limited to this structure, and the power reception connector 39, 57 on the vehicle body 30 side may be disposed in another site. FIG. 7 is a schematic view showing the constitution of an electric vehicle 90 to which a control apparatus for an electric vehicle according to another embodiment of the present invention is applied. Note that in the electric vehicle 90 shown in FIG. 7, identical members to the members shown in FIG. 1 have been allocated identical reference symbols, and description thereof has been omitted.

As shown in FIG. 7, a pair of charging cables 91, 92 are connected to the on-board charger 53 installed in the electric vehicle 90, and a power reception connector 93 is provided on a tip end portion of the charging cables 91, 92. Further, a connector locking mechanism 94 is provided on the tip end portion of the charging cables 91, 92, and the vehicle control unit 24 is connected to the connector locking mechanism 94. Hence, the electric vehicle 90 shown in FIG. 7 is structured such that the power reception connector 93 and the connector locking mechanism 94 are provided on the tip end portion of the charging cables 91, 92 extending from the vehicle body 30. Note that the charging cables 91, 92 extending from the vehicle body 30 are stored in a storage box or the like, not shown in the drawing, and are extracted from the storage box when required.

The connector locking mechanism 94 has a similar structure to the connector locking mechanisms 70, 73 described above, and therefore a locking pin 95 can be moved between a projecting position and a retracted position. Further, a concaved fitting hole 97 corresponding to the locking pin 95 of the connector locking mechanism 94 is formed in a power supply connector 96 on the external power supply side, to which the power reception connector 93 on the vehicle body 30 side is connected. Hence, by inserting the locking pin 95 of the connector locking mechanism 94 into the fitting hole 97 of the power supply connector 96 after connecting the power reception connector 39 to the power supply connector 96, the power reception connector 93 and the power supply connector 96 can be switched to the locked condition. Further, the vehicle control unit 24 switches the connector locking mechanism 94 between the restrained condition and the released condition on the basis of locking or unlocking of the door 31, and therefore similar effects to the effects described above can be obtained.

Figure 8:
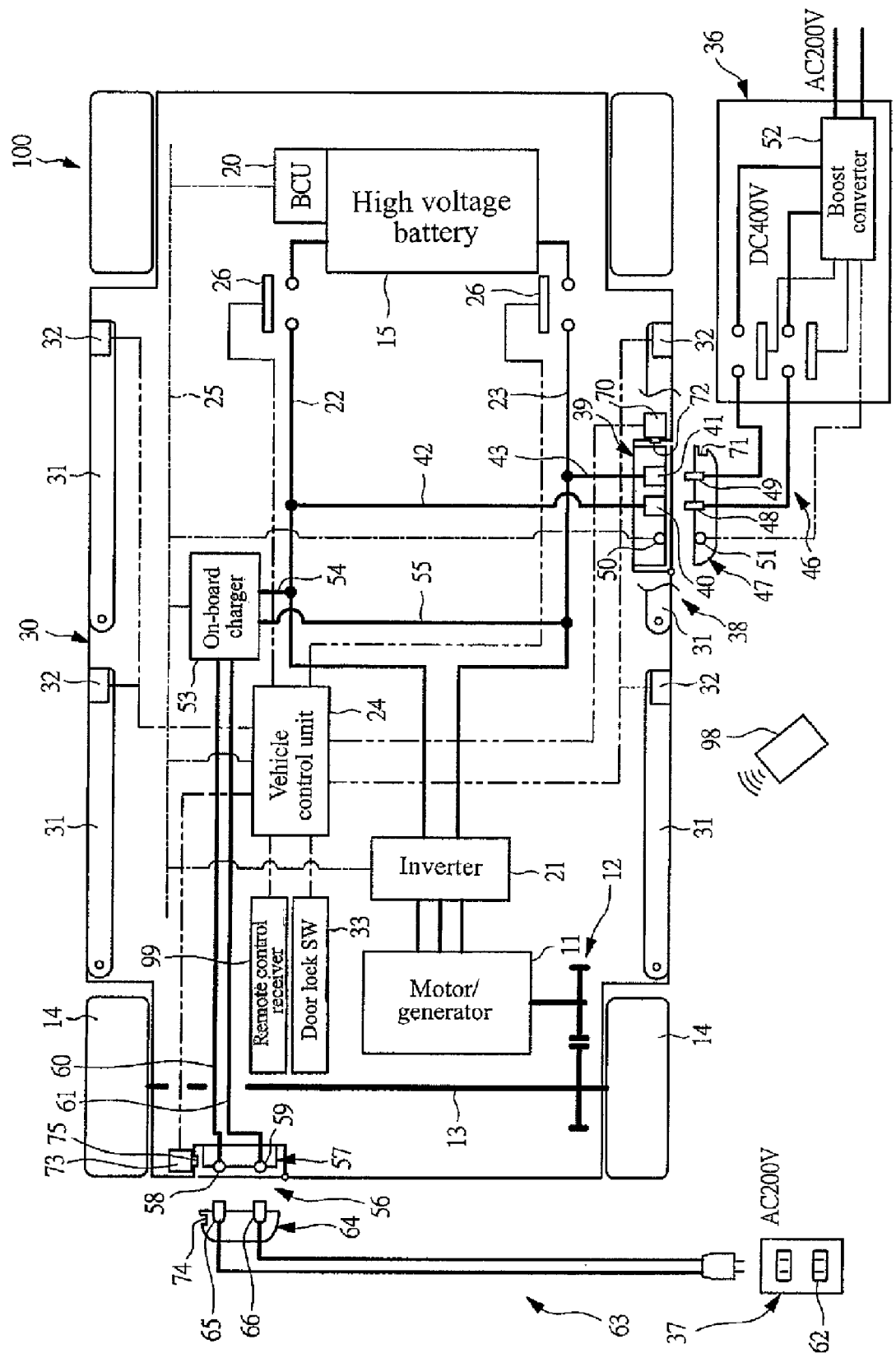
FIG. 8 is a schematic view showing the constitution of an electric vehicle to which a control apparatus for an electric vehicle according to another embodiment of the present invention is applied.

In the above description, the door 31 is locked and unlocked by operating the door lock switch 33 or the remote control key 34, as shown in FIGS. 1 and 7, but the present invention is not limited thereto, and the door 31 may be locked and unlocked using another method. For example, the present invention can be applied effectively to a case in which the door 31 is locked and unlocked using a so-called keyless access system, this system having begun to come to prominence in recent years. In a keyless access system, radio wave communication is performed between an access key 98 and a vehicle when a passenger carrying the access key 98 approaches the vehicle. By means of this communication, an ID code number is checked, and thus the door 31 can be locked and unlocked without performing a key operation. FIG. 8 is a schematic view showing a constitution of an electric vehicle 100 to which a control apparatus for an electric vehicle according to another embodiment of the present invention is applied. Note that in the electric vehicle 100 shown in FIG. 8, identical members to the members shown in FIG. 1 have been allocated identical reference symbols, and description thereof has been omitted.

As shown in FIG. 8, the electric vehicle 100 is provided with a remote control receiver 99 as a receiving unit for receiving an entry signal emitted from the access key 98. The remote control receiver 99 is constituted to receive signals within a predetermined range, and a noise shield, not shown in the drawing, is attached to the remote control receiver 99. The access key 98 is constituted to emit a radio wave (the entry signal) carrying an ID code signal at predetermined time intervals (of 0.1 seconds, for example). When a passenger carrying the access key 98 approaches the electric vehicle 100 and the remote control receiver 99 finishes checking the ID code after receiving the entry signal from the access key 98, the door 31 is switched to the unlocked condition. On the other hand, when the passenger carrying the access key 98 moves away from the electric vehicle 100 such that the remote control receiver 99 becomes incapable of receiving the entry signal from the access key 98, the door 31 is switched to the locked condition.

Figure 9:
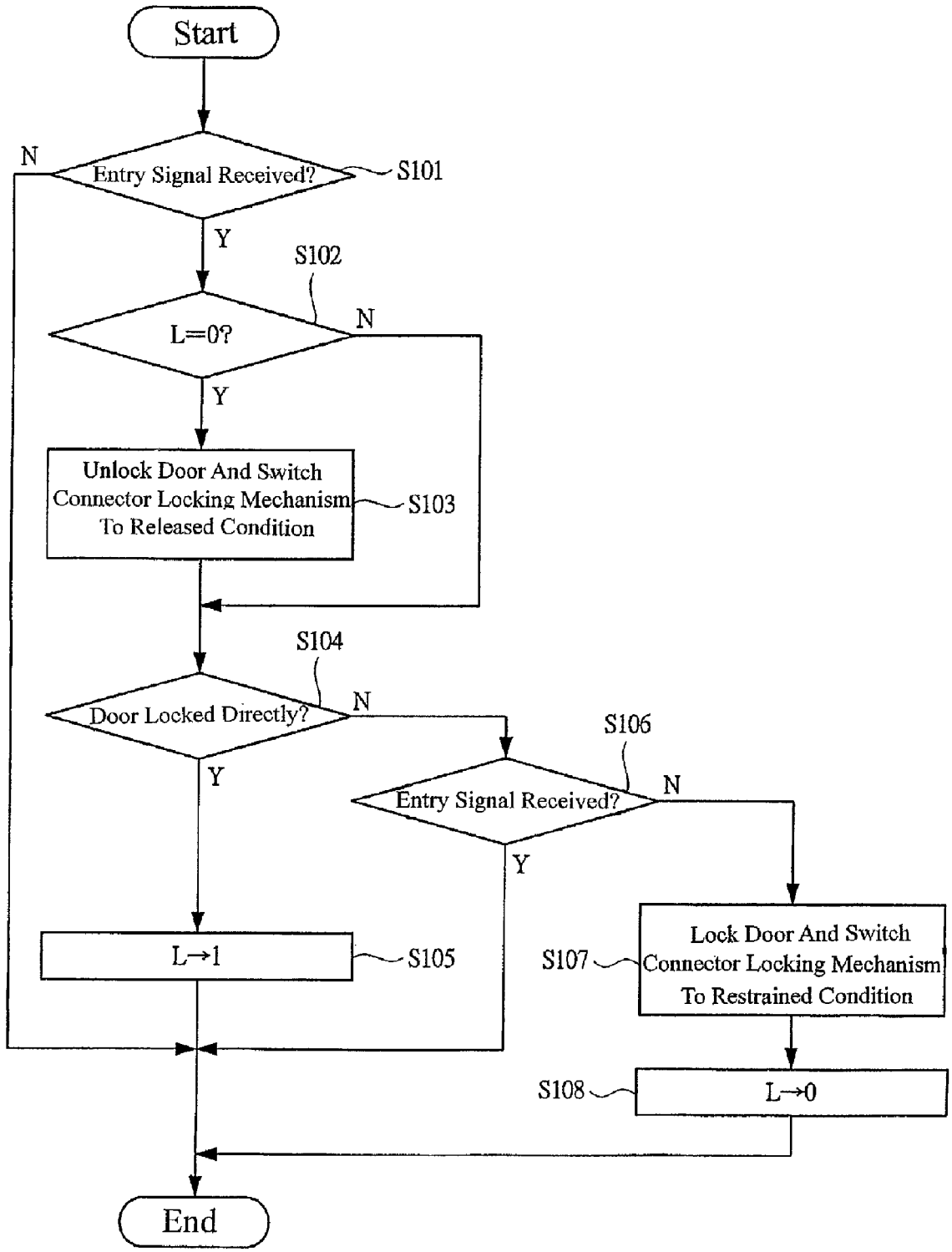
FIG. 9 is a flowchart showing another example of the procedure executed during connector lock control.

Next, a procedure executed during connector lock control in the electric vehicle 100 having the keyless access system will be described. FIG. 9 is a flowchart showing another example of the procedure executed during connector lock control. As shown in FIG. 9, in a step S101, a determination is made as to whether or not the remote control receiver 99 has received the entry signal. In other words, a determination is made as to whether or not the passenger carrying the access key 98 has approached the electric vehicle 100. When it is determined in the step S101 that the entry signal has been received, the routine advances to a step S102, in which a determination is made as to whether or not the door 31 has been locked by the access key 98, or in other words whether or not a flag L=0. In the step S102, a determination is made as to whether the flag L is at "0" or "1", L=0 indicating a state in which the door 31 has been locked by the access key 98 and L=1 indicating a state in which the door 31 has been locked directly by the door lock switch 33 or the like. When it is determined in the step S102 that the door 31 has been locked by the access key 98, the routine advances to a step S103, in which the door 31 is switched to the unlocked condition and the connector lock mechanism 70, 73 is switched to the released condition. In other words, when the passenger approaches the electric vehicle 100 and the door 31 is locked, the door 31 is unlocked and the connector lock mechanism 70, 73 is released.

Next, a determination is made in a step S104 as to whether or not the door 31 has been locked directly by the passenger. As described above, direct locking means locking the door 31 with the door lock switch 33 or the remote control key 34, for example, and does not include locking the door 31 with the access key 98. When it is determined in the step S104 that the door has been directly locked, the routine advances to a step S105, in which the flag is set at L=1 to prevent the door 31 from being unlocked by the access key 98. When it is determined in the step S104 that the door has not been directly locked, on the other hand, the routine advances to a step S106, in which a determination is made as to whether or not the entry signal has been received. When it is determined in the step S106 that the entry signal has not been received, the routine advances to a step S107, in which the door 31 is switched to the locked condition and the connector lock mechanism 70, 73 is switched to the restrained condition. In a subsequent step S108, the flag is set at L=0, whereupon the routine is exited. In other words, when the passenger moves away from the electric vehicle 100 while the door 31 is unlocked, the door 31 is locked and the connector lock mechanism 70, 73 is restrained.

Hence, when the door 31 is locked and unlocked automatically using the access key 98, the connector lock mechanism is switched between the released condition and the restrained condition in conjunction with the entry signal receiving condition. Therefore, when the passenger carrying the access key 98 moves away from the electric vehicle 100, the door 31 is locked automatically and the connector lock mechanism 70, 73 is switched to the restrained condition. As a result, identical effects to the effects described above can be obtained.

Note that in the keyless access system described above, the door 31 is unlocked automatically when the passenger carrying the access key 98 approaches the vehicle and the door 31 is locked automatically when the passenger moves away from the vehicle. However, a keyless access system is not limited to this type of system, and may be a system in which the door 31 is locked and unlocked without a key by operating a request switch provided on the door 31 as well as when the passenger carrying the access key 98 approaches and moves away from the vehicle, for example.

The present invention is not limited to the embodiments described above, and may be subjected to various modifications within a scope that does not depart from the spirit thereof. For example, the electric vehicles 10, 90, 100 shown in FIGS. 1, 7 and 8 include only the motor/generator 11 as a power source, but the present invention is not limited thereto, and may be applied to a hybrid type electric vehicle that includes an engine as a power source in addition to the motor/generator 11. Furthermore, in the above description, the connector locking mechanism 70, 73, 94 is structured such that the locking pin 72, 75, 95 is inserted into the fitting hole 71, 74, 97 provided on the power supply connector 47, 64, 96 side, but the present invention is not limited thereto, and a connector locking mechanism that switches the power reception connector 39, 57, 93 and the power supply connector 47, 64, 96 to the locked condition by means of another structure may be employed. Note that in the above description, a lithium ion battery is provided as the storage device, but another type of battery or a capacitor may be provided as the storage device.

What is claimed is:

1. A control apparatus for an electric vehicle including a storage device that is charged by an external power supply, in which a power supply connector on said external power supply side is connected to a power reception connector on a vehicle body side when said storage device is charged, said control apparatus comprising:
  a door lock determiner determining a lock condition of a door provided in said vehicle body;
  a connector locking mechanism that is provided on said vehicle body side and is switched between a restrained condition, in which said power supply connector and said power reception connector are set in a locked condition, and a released condition, in which said power supply connector and said power reception connector are set in an unlocked condition; and
  a connector lock control switching said connector locking mechanism to said restrained condition when said door is in a closed locked condition.

2. The control apparatus for an electric vehicle according to claim 1, wherein said connector lock control switches said connector locking mechanism to said released condition when said door is in an unlocked condition.

3. The control apparatus for an electric vehicle according to claim 1, wherein said connector locking mechanism comprises a solenoid coil, and
  said connector locking mechanism is switched to said restrained condition when said solenoid coil is de-energized and switched to said released condition when said solenoid coil is energized.

4. The control apparatus for an electric vehicle according to claim 1, wherein said power reception connector and said connector locking mechanism are provided in a charging port portion disposed in said vehicle body.

5. The control apparatus for an electric vehicle according to claim 1, wherein said power reception connector and said connector locking mechanism are provided on a tip end portion of a charging cable extending from said vehicle body.

6. The control apparatus for an electric vehicle according to claim 1, wherein said door is a passenger door.

* * * * *